United States Patent

Flanagan

[15] 3,685,039

[45] Aug. 15, 1972

[54] VIDEO DATA DISPLAY SYSTEM

[72] Inventor: Michael I. Flanagan, Bedford, Mass.

[73] Assignee: Viatron Computer Systems Corporation, Bedford, Mass.

[22] Filed: April 9, 1969

[21] Appl. No.: 814,534

[52] U.S. Cl........340/324 A, 178/DIG. 22, 340/172.5

[51] Int. Cl..................................................G06f 3/14

[58] Field of Search.............340/324 A; 178/DIG. 22

[56] References Cited

UNITED STATES PATENTS

| | | | |
|---|---|---|---|
| 3,345,458 | 10/1967 | Cole et al. | 340/324 X |
| 3,388,391 | 6/1968 | Clark | 340/324 |
| 3,396,377 | 7/1968 | Strout | 340/324 |
| 3,400,377 | 9/1968 | Lee | 340/324 X |
| 3,528,068 | 9/1970 | Johnson | 340/324 A |

*Primary Examiner*—David L. Trafton

*Attorney*—Charles Hicken

[57] ABSTRACT

A data display system is disclosed utilizing a conventional television receiver for selectively displaying groups of characters comprising stored data and particularly data of the general type and quantity conventionally recorded on the usual computer punch cards. The video display system is adapted for transferring data already recorded or being recorded in a memory storage unit to the television antenna terminals or video inputs of a monitor without requiring any modification of the receiver or monitor. The display system operates with a master clock or timer circuit which facilitates the read out and conversion of the information from the coded memory data to a video bit stream. The master clock provides standard synchronizing signals for the video display and these same signals also are used to synchronize the several subcircuits utilized in the data transfer from a data memory to the video display.

3 Claims, 7 Drawing Figures

INVENTOR.
MICHAEL J. FLANAGAN
BY James J Cannon,
ATTORNEY

INVENTOR.
MICHAEL J. FLANAGAN
BY
ATTORNEY

PATENTED AUG 15 1972 3,685,039

SHEET 3 OF 6

INVENTOR.

MICHAEL J. FLANAGAN

BY James J Cannon

ATTORNEY

PATENTED AUG 15 1972

3,685,039

SHEET 4 OF 6

INVENTOR.
MICHAEL J. FLANAGAN
BY James J. Cannon
ATTORNEY

PATENTED AUG 15 1972

3,685,039

INVENTOR.
MICHAEL J. FLANAGAN
BY James J. Cannon
ATTORNEY

INVENTOR.
MICHAEL J. FLANAGAN
BY James J. Cannon
ATTORNEY

VIDEO DATA DISPLAY SYSTEM

BACKGROUND OF THE INVENTION

The present display system provides a visual indication of data which is stored in a memory circuit and which may have been pre-recorded or which is being recorded by an operator as, for example, on a magnetic recording tape. Such data is now stored and used in enormous volume in a wide variety of everyday business and other operations. One important recording medium now in use for data or computer systems is the well-known punch card. A standardized system for these cards records 80 characters across the face of a card utilizing vertically aligned perforations for each of the 80 characters which may be, for example, a punched recording of the regular USASCII (ASCII) character code.

These cards are now prepared on punch machines operated by punch card operators. The cards are physically inserted into the punching apparatus and the appropriate perforations are made as the operator manipulates a typewriter keyboard. During each encoding, the operator has no convenient manner in determining the correctness of the data encoded on the card. In order to check against errors, the present standard procedure requires a second verifier card to be typed by another operator and compared with the original card.

An important function of the present display system is to facilitate the replacement of the cards with a recording tape by providing the operator with a simultaneous video display of the data which the operator is typing onto the tape. Each letter which is recorded is instantaneously shown on the viewer and the completed data entry is visible in its entirety for a check. In addition, a simultaneous display on an adjacent area of the viewing screen is provided of preprogramed guide data for assisting the operator in following a particular data format. The ASCII code or other code may be magnetically recorded on such tape and the accuracy of the encoding is assured by the visual presentation of the data as it may be simultaneously recorded on the tape and fed into the memory system for viewing on the present display device. After the data has been entered into the memory storage or placed onto a magnetic tape, it may also be selectively redisplayed at any time from the tape or from the memory for use in various data retrieval or data review operations. The direct recording of data onto magnetic tape is facilitated by the video viewing of the entries which permits up to 1,000 typical data entries of 80 characters each to be made on a small tape cartridge. These entries may thereafter be read out on the viewer or transferred to punch cards or other storage media.

SUMMARY OF THE INVENTION

The present invention provides a means for a video display of stored data and in particular adapts a conventional television receiver display system for providing such a display without modification of the television set. This result is obtained by feeding the stored data through a video signal generating circuit under control of an overall timing system which synchronizes the read out and signal conversion operation with conventional vertical and horizontal sweep frequency signals for the television display system. This eliminates the need for a specialized cathode ray tube display system and permits this function to be performed by previously developed, reliable, relatively inexpensive, commercially available television receivers.

Data which is to be illustrated in a field of 80 characters divided into four lines of 20 characters each is first fed into or stored in a circulating shift register in a code such as the ASCII code. The circulation of this data is initiated by the video display vertical synchronizing pulse. This data is now transferred line by line to a second shift register known as the character memory shift register. The character memory shift register facilitates the conversion of the stored ASCII code into the video beam modulating signal. The characters to be displayed on the video screen are each a pattern five bits wide and seven raster lines deep. The line of characters is formed in the display circuit by first converting the top pattern line of all 20 characters into the proper video code by addressing the 20 characters successively to a read only memory (ROM) and by addressing the top line portion only of the characters as arranged in the ROM. Thus, 20 successive five bit video encoded signals will be generated from the ROM data for the top line of the characters and these 20 parallel signals are now formed into a serial bit stream by a video generator so that they may be either coupled directly to the video input of the video system or so that they may be fed into a modulator coupled to the antenna terminals of the television set.

Since the 20 characters in the character memory shift register form the top line only of each of the characters when first addressed to ROM, it is seen that the 20 characters in the character memory shift register are recirculated seven times so that the additional six lines of each character are formed into the necessary serial bit stream for display as they are addressed to the ROM and thence to the video generator. A separate address circuit coupled to a horizontal line counter addresses the ROM to advance the proper one of the seven lines of the characters as arranged in the ROM.

Since the circulation of the characters being read out from the main memory are thus coordinated with the video raster or line display and since the characters are formed on predetermined raster lines, the above described 20 character memory shift register as well as the ROM and the video generator are controlled by a line counter which counts and keeps track of the horizontal lines or traces on the video screen to control the passage of the coded data or the modulating video bit stream onto the video lines at the proper intervals.

BRIEF DESCRIPTION OF THE DRAWING

A preferred embodiment of the invention has been chosen for purposes of illustration and description and is shown in the accompanying drawings, forming a part of the specification, wherein.

THE DATA SOURCE OR MEMORY

Figure 1:
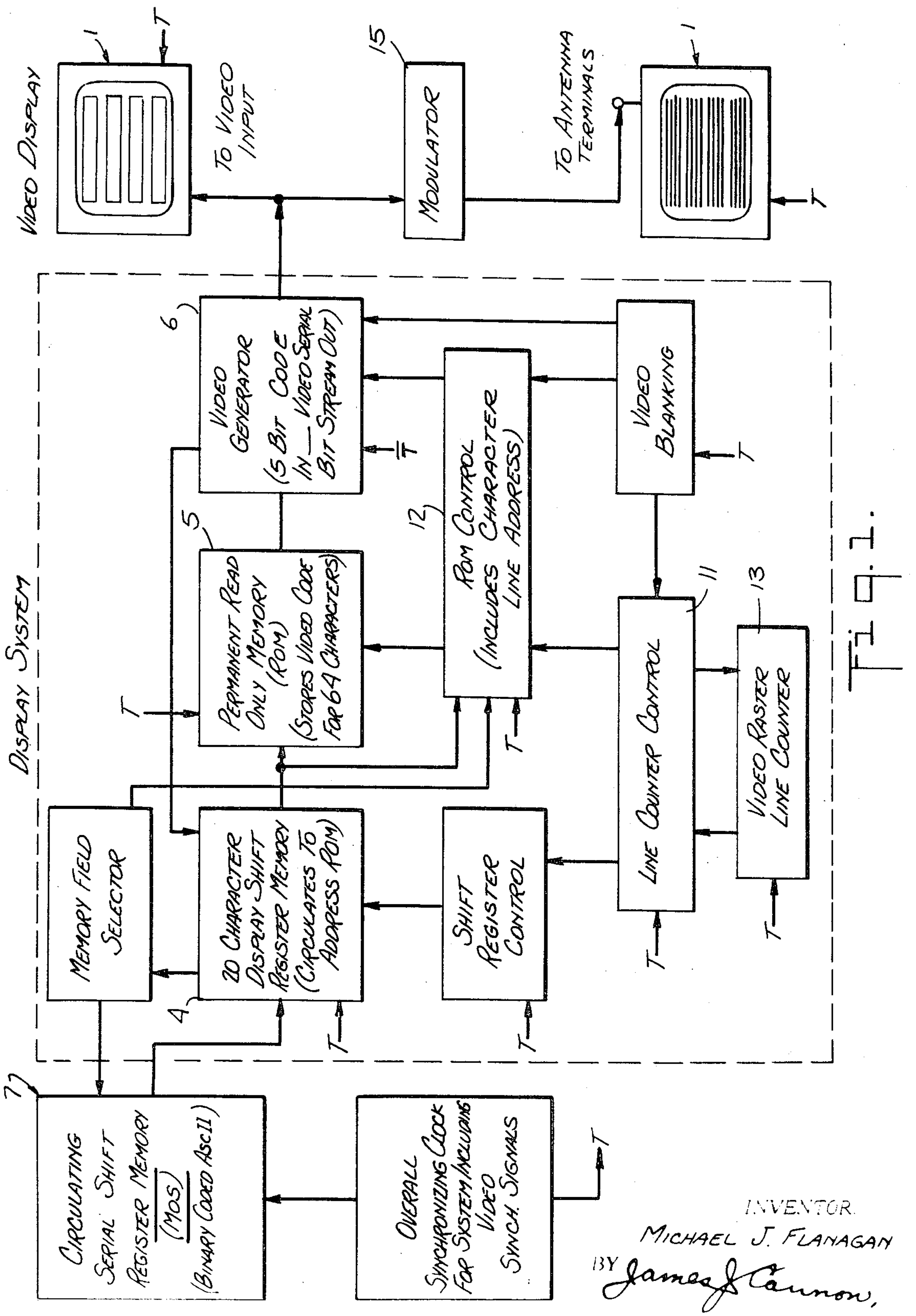
FIG. 1 is a diagrammatic illustration of a preferred embodiment of the video display system in accordance with the present invention.
Figure 2:
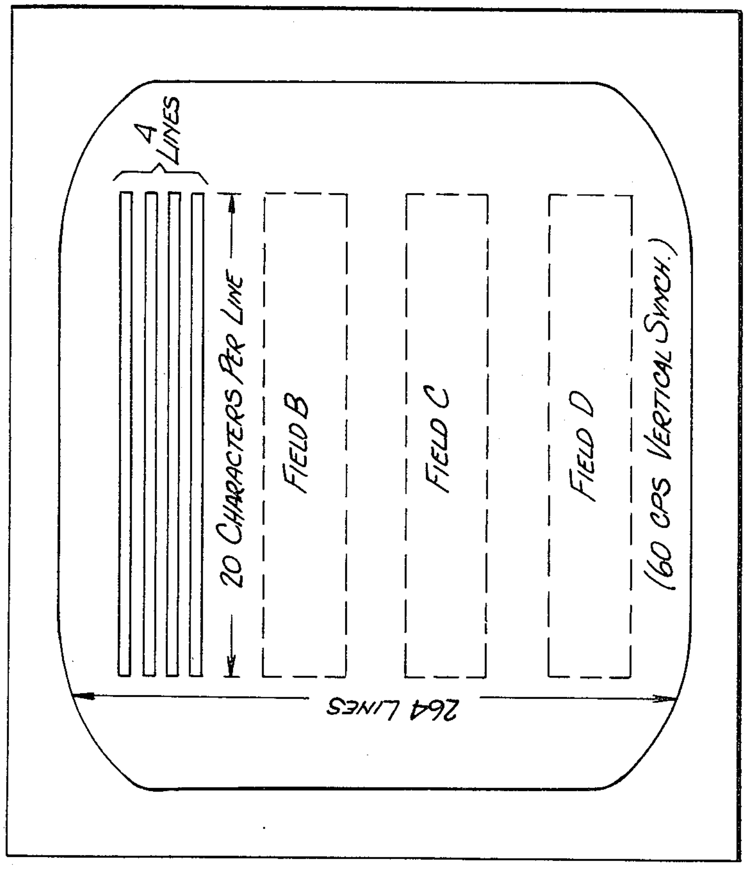
FIG. 2 is a diagrammatic illustration of a preferred arrangement of the form of the video display of the data.
Figure 4:
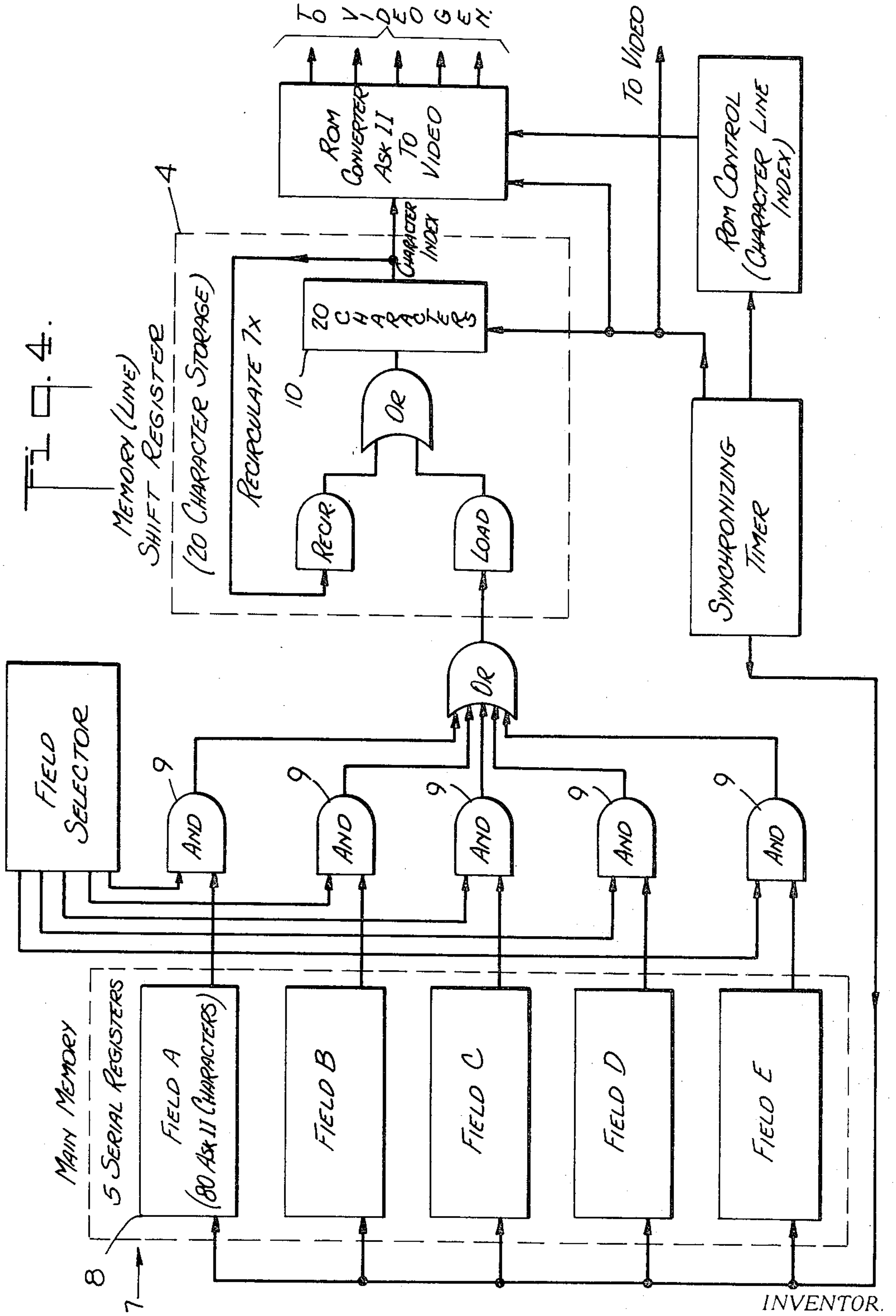
FIG. 4 is a diagram illustrating a preferred embodiment of the character memory shift register as coupled to a main data memory and the ROM.

The data display system is designed for displaying recorded data (or data being recorded) in a preset format. While the system as described may be used with a number of data sources, a particular embodiment has been designed for use in displaying several data fields each consisting of 80 characters with the characters arranged in four lines of 20 characters each. FIG. 2 shows a preferred video display 1 with fields 2 having four lines 3 of 20 characters each. The display system is based upon a timing arrangement whereby each of the lines 3 of 20 characters is fed one at a time into a memory shift register 4 (FIGS. 1 and 4). The function of this memory shift register 4 which will be further described below, is in general to hold the 20 characters for a sufficient period to address them to a read only memory (ROM) 5 and a video signal generator circuit 6 to form the video bit stream for that line 3 on the video screen 1.

A suitable main memory 7 for use in the circuit and one which will be used in this description comprises circulating shift register 8 which stores (FIG. 4) and which will continuously circulate a predetermined number of characters past an unload point. The unload point, for example, where an ASCII code is used, may be an eight-bit register. Thus, the circulating shift register 8 will continuously feed the eight bits of successive characters into an output register as the 20 successive eight bits are transferred into the 20-character memory shift register 4 of the present display device. In order to synchronize this transfer and the subsequent conversion of the characters into the video signal, the main memory circulation is commenced by the vertical sync pulse used in the video display 1 so that the circulating of the stored characters will be synchronized with the tracing of the video raster.

The initiation of the character transfer from the main memory 7 output register and to the memory shift register 4 is controlled by a demand signal which is synchronized with the video horizontal sync signal and which will be further described below in connection with Table 1 which illustrates the timing operation whereby four data fields 2 each consisting of four lines 3 of 20 characters each is simultaneously displayed and effectively spaced on the video screen 1.

Since the main memory circulation and transfer is controlled by the above noted synchronizing signals, it is clear that its circuit need include no additional operations or interupts. The main memory registers 8, therefore, may be standard serial memories adapted to continuously circulate past an unload point with the initiation of this circulating being started under the control of the vertical video sync signal for each display desired and with the bit transfer gate 9 to the character memory shift register 4 being opened by a control signal based on a video raster line counter.

Figure 3:
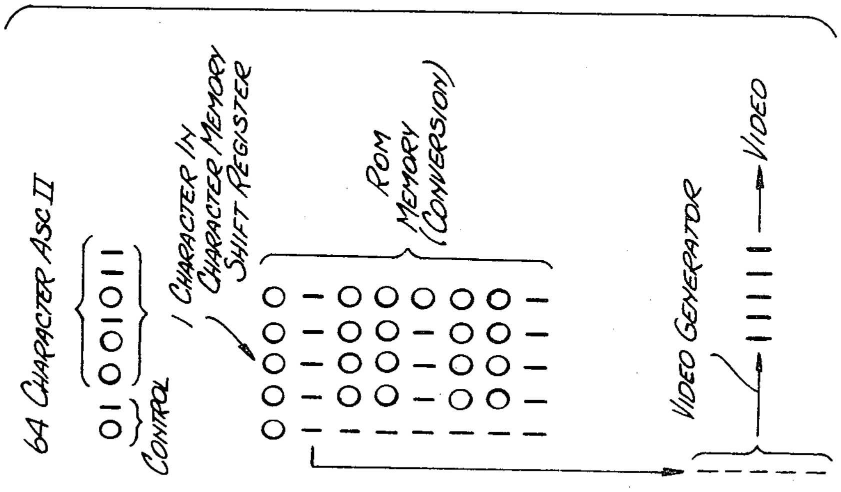
FIG. 3 is a chart illustrating successive forms of the encoded data in sections of the display system.

In the preferred embodiment of the display system, as indicated above, the information is preferably displayed in separate fields 3 (FIG. 2) each consisting of four lines 3 having up to 20 characters in each line. The preferred display pattern for each individual character is a grid-like arrangement of five bits across the seven video raster lines down. FIG. 3, for example, illustrates the letter E encoded by the ROM in such an arrangement with the "one" portions being translated into a beam-on signal at the video signal generator.

The character memory shift register circuit 4 is arranged to facilitate this display. For this purpose, it includes a register 10 (FIG. 4) which is loaded with the 20 characters of the line 3 to be displayed as those 20 characters circulate past the unload point of the main memory registers 8 as described above. The character memory shift register 10 thus stores the 160 bits (8 × 20) for the particular line to be displayed. These 20 characters are now recirculated seven times while the character ROM converts the characters to video bit signals. In this operation, the 20 characters are successively addressed to the ROM 5 while a simultaneous and synchronized line control signal from the line counter control 11 is also addressed to the ROM to control the particular line of the seven lines of each character which is being converted to the video bit stream. Thus, the 20 characters in the character memory register 10 are first serially addressed to the character ROM 5 so that a succession of 20 video five-bit signals are formed for conversion in the video generator to a serial bit stream to trade the top line of the 20 characters on the video screen (FIG. 3). Thereafter, the 20 characters are again addressed to the ROM 5 while the second line of each of the characters is converted by the ROM 5 and the video generator 6 to the appropriate video bit stream. This circulation continues seven times until, as seen in Table 1, the entire line of 20 characters has been scanned and shown on the video screen 1 on lines 34 through 40 of the video screen raster. When this conversion is completed for the line of 20 characters, the television trace is blanked out for one line and then control or cursor signals are transferred to the video screen for an additional three lines in the same manner. Thereafter, the next 20 characters of the next line 3 in the display field 2 are loaded into the character memory shift register 4 and a similar circulation of the characters forms the visible display on lines 47 through 53 of the video screen raster.

Each set of 80 characters is thus seen to be displayed on specific lines of the 264-line video raster as shown in Table 1 below. Table 1 actually shows four fields on "-card images" being displayed. Each card image contains 4 rows of data with 20 characters per row. The total display is thus 4×80 = 320 characters. Each row of 20 characters occupies 13 lines, seven for the characters, three for field marker and cursor data (FM/C), and the remaining two lines for transfers and one spare line. The 20 characters are transferred from the main memory in one horizontal line time, approximately 63 microseconds in this case. At the end of four rows of data, four extra lines are left blank in order to provide space between sets of 80 characters.

The timing of the recirculating frequency of the main memory must be a multiple of the line frequency of the display, and the total display time (264 lines at 60 cps in this case) must be in synchronism with the main memory. Thus, as the timing chart shows by having an odd multiple of four lines ($4m+1=13$) for each display row of characters, the sets of 20 characters: 1–20, 21–40, 41–60, and 61–80 precess past the load point. Thus, when the demand signal comes from the display, the correct set of 20 characters is available at the load point of the main memory for transfer to the display memory 4. Table 1 shows that a total of four memories with 80 characters per memory can be displayed. Even more data may be displayed by reducing the number of lines per row from 13 to nine, for example, and increasing the number of characters per line. The basic method, however, would remain the same.

TABLE 1 (TIMING CHART)

This chart shows the functions performed in the display circuit in the time period corresponding to that of each of the video display 1 raster lines and also indicates the position of the characters circulating past the load point in the main memory 7.

TABLE 1

| Raster line no. | Function | Characters Passing Load Point Load Point In Main Memory |
|---|---|---|
| 1 | | 1–20 |
| 2 | | 21–40 |
| 3 | Vertical Blanking | 41–60 |
| 4 | of Video Screen | 61–80 |
| 5 | | 1–20 |
| 6 | | 21–40 |
| 7 | | 41–60 |
| 8 | | 61–80 |
| to | | |
| 32 | | |
| 33 | Xfer 1–20 to Memory | 1–20 |
| 34 | Shift Register | 21–40 |
| 35 | | 41–60 |
| 36 | Display Character | 61–80 |
| 37 | 7–20 on Video Screen | 1–20 |
| 38 | i.e. (recirculate 7 | 21–40 |
| 39 | times in character | 41–60 |
| 40 | memory shift | |
| | register 10) | 61–80 |
| 41 | Xfer FM/C | 1–20 |
| 42 | Display FM/C on | 21–40 |
| 43 | Video Screen 1 | 41–60 |
| 44 | | 61–80 |
| 45 | Spare | 1–20 |
| 46 | Xfer 21–40 | 21–40 |
| 46 | Xfer 21–40 | 21–40 |
| 47 | | 41–60 |
| 48 | Display | 61–80 |
| 49 | Character | 1–20 |
| 50 | 21–40 | 21–40 |
| 51 | | 41–60 |
| 52 | | 61–80 |
| 53 | | 1–20 |
| 54 | Xfer FM/C | 21–40 |
| 55 | | 41–60 |
| 56 | Display FM/C | 61–80 |
| 57 | | 1–20 |
| 58 | Spare | 21–40 |
| 59 | Xfer 41–60 | 41–60 |
| 60 | | 61–80 |
| 61 | | 1–20 |
| 62 | Display | 21–40 |
| 63 | Character | 41–60 |
| 64 | 41–60 | 61–80 |
| 65 | | 1–20 |
| 66 | | 21–40 |
| 67 | Xfer FM/C | 41–60 |
| 68 | | 61–80 |
| 69 | Display | 1–20 |
| 70 | | 21–40 |
| 71 | Spare | 41–60 |
| 72 | Xfer 61–80 | 61–80 |
| 73 | | 1–20 |
| 74 | | 21–40 |
| 75 | Display | 41–60 |
| 76 | Character | 61–80 |
| 77 | 61–80 | 1–20 |
| 78 | | 21–40 |
| 79 | | 41–60 |
| 80 | Xfer FM/C | 61–80 |
| 81 | | 1–20 |
| 82 | Display FM/C | 21–40 |
| 83 | | 41–60 |
| 84 | Spare | 61–80 |
| 85 | Spare | 1–20 |
| 86 | Spare | 21–40 |
| 87 | Spare | 41–60 |
| 88 | Spare | 61–80 |
| 89 | | 1–20 (B) |
| 90 | Xfer 1–20 (B) | |
| 91 | | |
| 92 | Repeat | |
| 93 | | |
| 94 | of | |
| 95 | | |
| 96 | 1–20 (A) 6 | |
| 97 | | |
| 98 | | |
| 99 | | |
| 100 | | |
| 101 | | |
| 102 | Xfer 21–40 (B) | |
| 115 | Xfer 41–60 (B) | |
| | Xfer 61–80 (B) | |
| 145 | Xfer 1–20 (C) | |
| 158 | Xfer 21–40 (C) | |
| 171 | Xfer 41–60 (C) | |
| 184 | Xfer 61–80 (C) | |
| 201 | Xfer 1–20 (D) | |
| 214 | Xfer 21–40 (D) | |
| 227 | Xfer 41–60 (D) | |
| 240 | Xfer 61–80 (D) | |
| 241 | | 1–20 |
| 242 | | 21–40 |
| 243 | Display | 41–60 |
| 244 | Character | 61–80 |
| 245 | 61–80 (D) | 1–20 |
| 246 | | 21–40 |
| 247 | | 41–60 |
| 248 | Xfer FM/C | 61–80 |
| 249 | | 1–20 |
| 250 | Display FM/C | 21–40 |
| 251 | | 41–60 |
| 252 | | 61–80 |
| 256 | BLANK | 61–80 |
| 260 | | 61–80 |
| 264 | | 61–80 END OF DISPLAY |

CHARACTER READ ONLY MEMORY (ROM)

As indicated above, the characters to be displayed are originally stored in one of the several fields 8 (FIG. 4) of the main memory 7 in the form of a binary coded ACSII. A line of these characters is then brought out to the character memory shift register 4 for being presented or addressed to the read only memory or ROM 5 and to be thereby transformed to the video bit stream to form the visual indication of the characters on the display screen 1. The character ROM comprises a read only 512 (64×8) by five-bit memory matrix of the known design wired so that it reads out parallel bit signals for one line at a time for the top lines of each of the 20 characters as it is simultaneously addressed in turn by each of the 20 characters in the character memory shift register 4 and by a line address signal from the ROM control 12 for the appropriate one of the seven vertical character lines. This line address is provided by the character ROM control circuit 12 under the additional control of the video raster line counter 13 (FIG. 1) and the line counter control 14.

Thus, the character memory shift register 4 recirculates its 20 characters seven times so that the ROM successively feeds 140 five-bit video signals to the video generator 6 where the 140 parallel bits signals are converted to a continuous serial bits stream.

VIDEO GENERATOR

As described generally above and as illustrated, for example, in FIG. 3, the video generator 6 functions to translate the groups of five bit parallel coded output signals from the ROM 5 into a continuous serial bit stream so that the video generator 6 output may be used as a direct input for the video section 1 of the display set or alternatively so that it may be used to modulate a carrier signal in modulator 15 so that the display signal may be coupled directly to the terminals 16 of one or more display sets.

Figure 5:
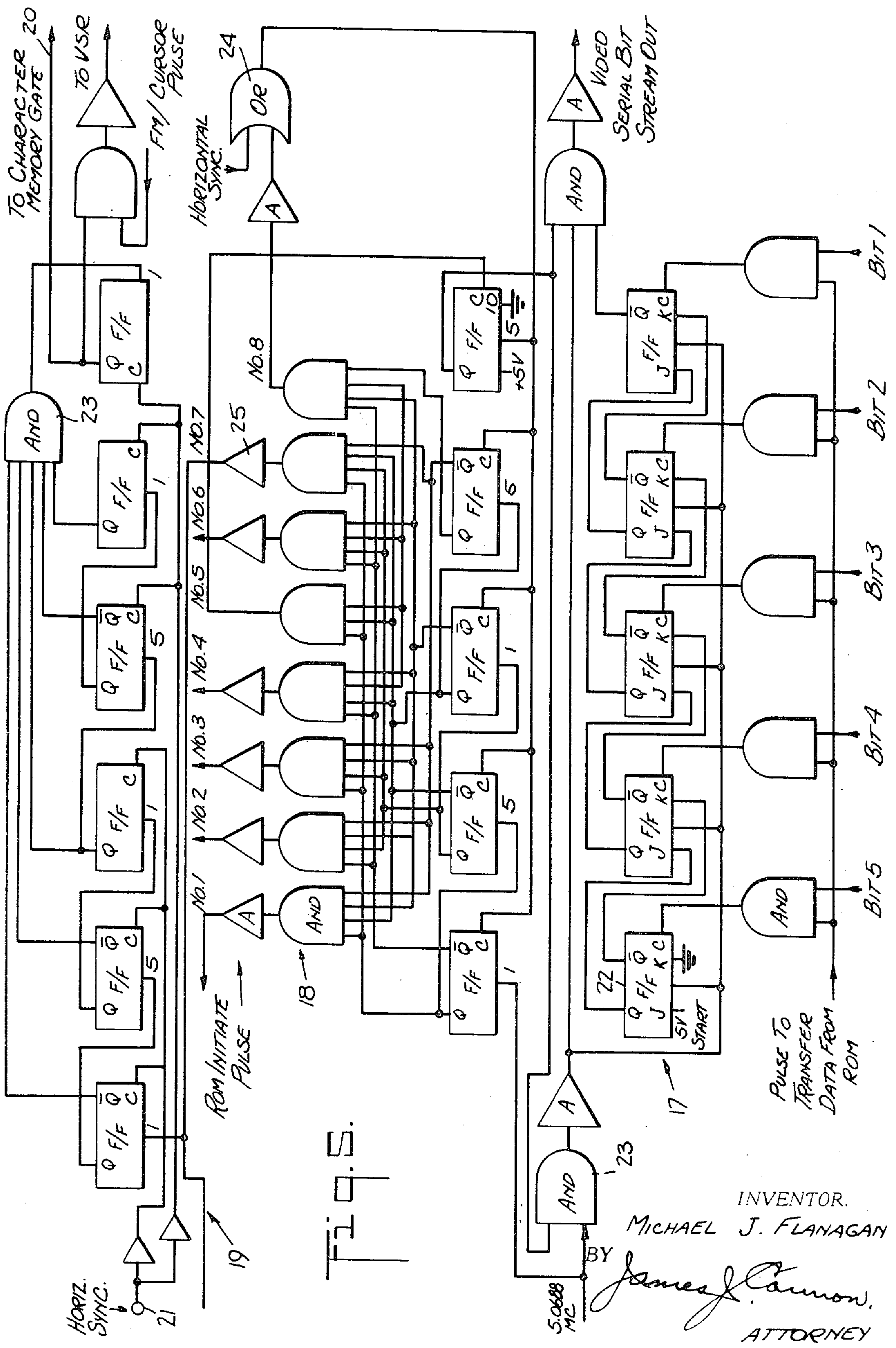
FIG. 5 is a diagram illustrating a preferred embodiment of a video generator as used in the display system.

FIG. 5 is a diagrammatic illustration in logic form of a preferred arrangement of the video generator circuit comprising the arrangement illustrated of JK flip-flop circuits (F/F) 22 AND-gates 23, OR-gates 24 and amplifiers or drivers 25. The circuit is a parallel in serial out shift register and is seen to receive the five parallel bits from the ROM memory 5 on the five inputs at the lower portion of the diagram 17. These input bits pass through the five flip-flop circuits shown and is serially shifted out of the register and is sampled by the 5.0688 mc pulses from the master clock input. A 5.0688 mc train of 1's and 0's is produced that matches the five-bit entry from the ROM. Video output pulses (VSR'S) 1–8 are produced by a counter such as the ripple counter and decoder 18 illustrated at the center portion of the diagram. The counter 18 provides eight pulses including five "ON" pulses for the ROM and three "OFF" pulses for the space between the characters. The upper portion of the circuit comprises six flip-flop circuits arranged as shown as a character counter 19 counts the 20 characters in each line and to provide a clearing signal or control signal output 20 to the character memory shift register 4 for causing the next line to be recirculated therein and fed to the ROM 5 and into the video generator 6 to form the next line of 20 characters for the video display. The counter 19 is cleared by the horizontal sync input 21.

LINE COUNTER AND COUNTER CONTROLS

As described above, the visual display of the data on the video screen 1 has been arranged to take advantage of the conventional video vertical and horizontal synchronizing pulses and additionally, the decoded data or the characters to be displayed are formed to occupy seven lines vertically of the video raster in a five-bit ON and three-bit OFF pulse pattern horizontally.

In order to provide this result, the functions of the system are controlled in the manner illustrated in Table 1 with the decoding or conversion circuits having their action initiated at the commencement of the proper raster line and with loading and unloading functions in the shift registers taking place after the necessary number of lines have been displayed as, for example, after seven lines have been displayed to form one line of 20 characters. The vertical spacing of the information is obtained by including blanking lines in the vertical line counter and the horizontal spacing or vertical margins are obtained by blanking or delaying the coded or modulated signals for the proper interval as the video bit stream is fed either into the video section of the displayer or into a modulator.

Figure 6:
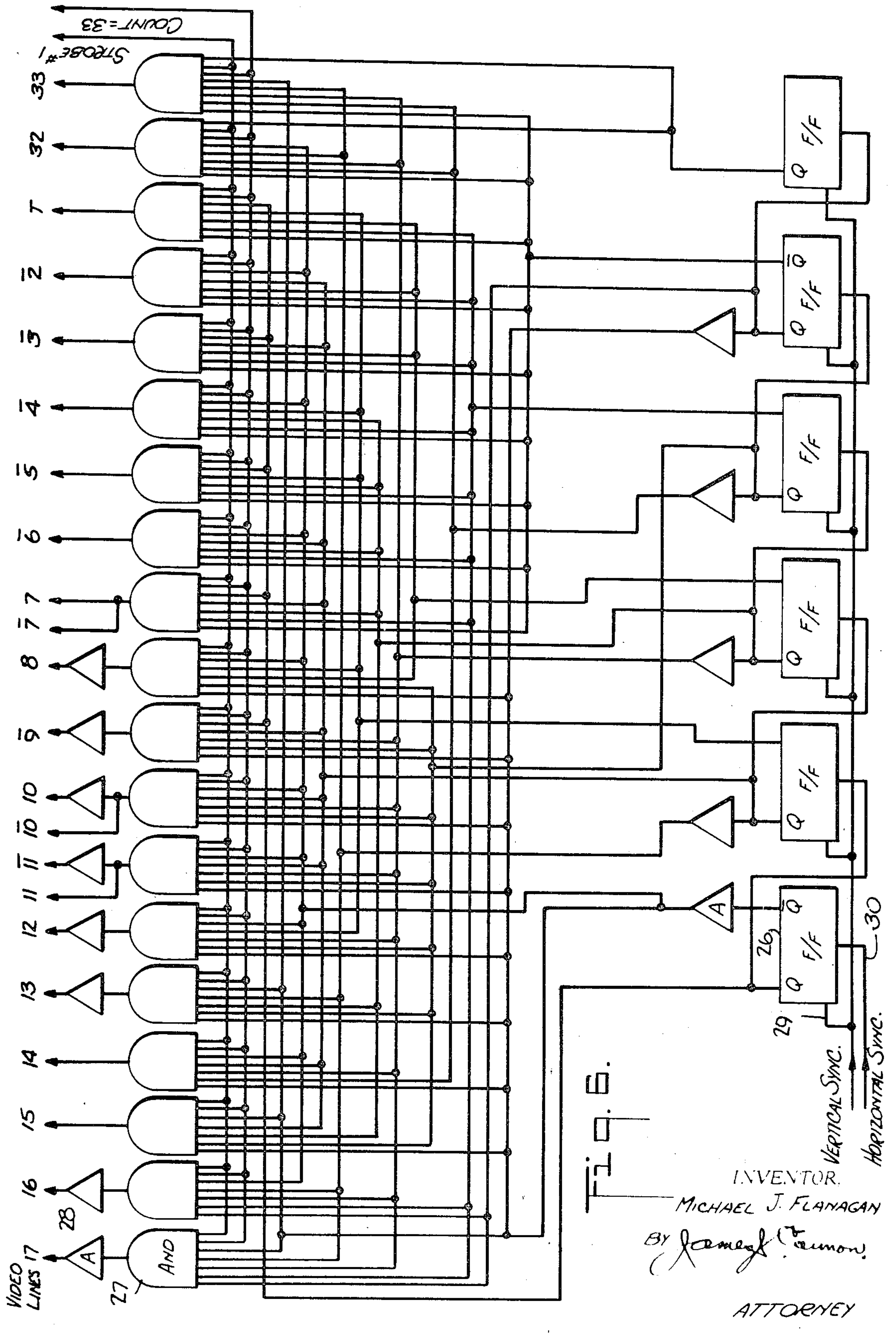
FIG. 6 is a diagram illustrating a preferred embodiment of the line counter.

FIG. 6 illustrates the counter 13 in a logic diagram form comprising standard flip-flop circuits 26 AND gates 27 and amplifier drivers 28 operated by the vertical and horizontal sync pulses to initiate the counter and to count the necessary number of steps for controlling the above functions. The preferred matrix arrangement is shown with the inputs 29 and 30 shown at the lower left hand corner being fed to the six flip-flops 26 registers and with the output gates 27 illustrated for counting raster lines 1 through 17 as well as a 33 count to provide the screen top blanking as shown on Table 1. For example, the Table 1 on line 33 the first 20 characters are transferred to the character memory shift register 4.

BLANKING

Figure 7:
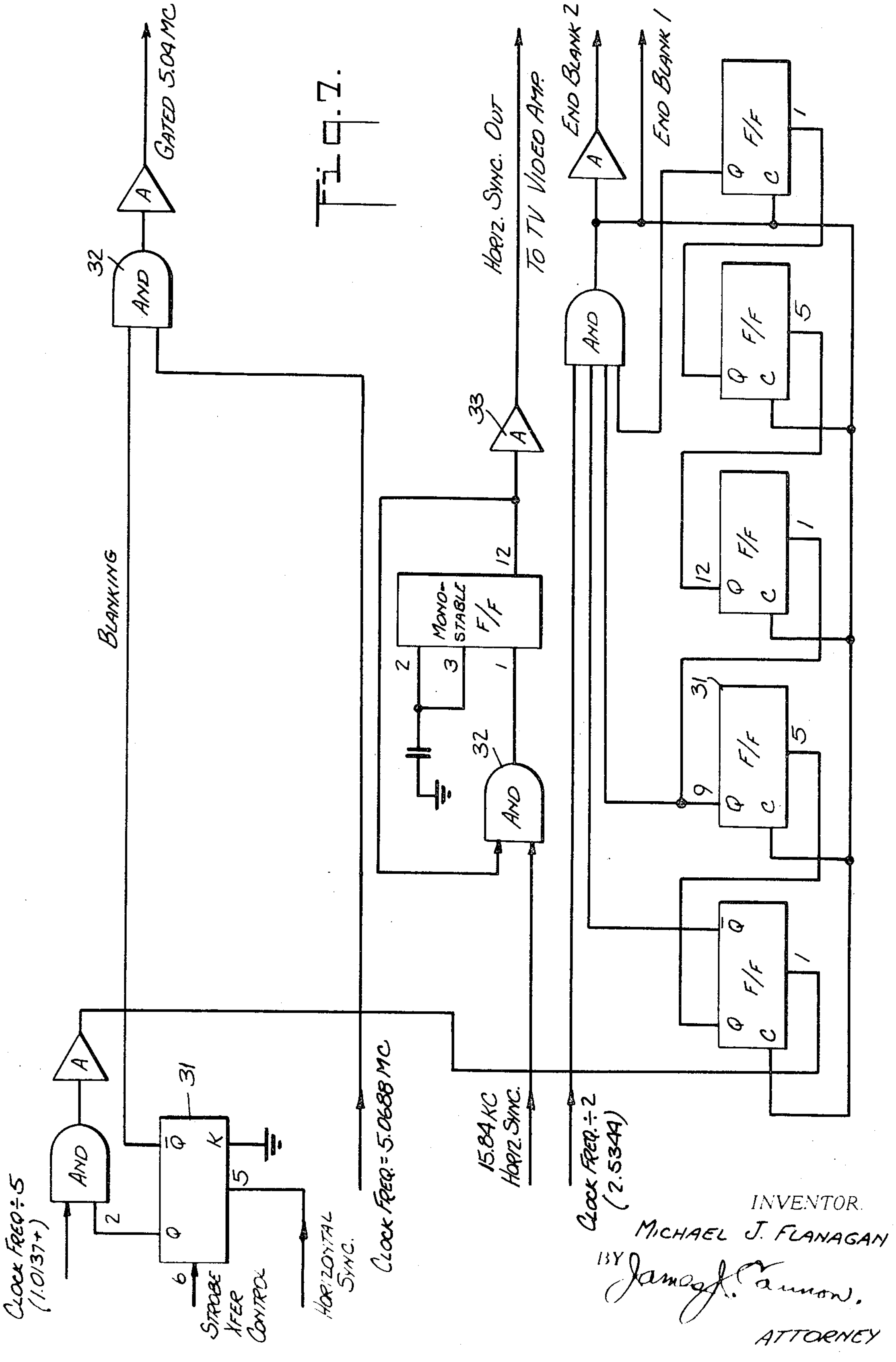
FIG. 7 is a diagram illustrating a preferred embodiment of the video screen blanking circuit.

The above described data pattern is seen to require vertical blanking to arrange the lines of characters on the video screen on the proper vertical intervals and to also require vertical margins to conveniently space the ends of the lines. The vertical blanking is seen to result from the line counting function as illustrated and described in connection with Table 1. The vertical margins are controlled by a similar timing or delay of the data conversion operation to cause the converted data as it is fed into the video screen to be delayed the proper interval after the initiation of the horizontal sync signal for the appropriate raster lines. A preferred blanking circuit is illustrated in FIG. 7 including flip-flops 31, AND-gates 32 and drivers 33. The main timing clock inputs are illustrated at the left hand side including the 15.84 kc horizontal sync signal and clock divided by five and clock divided by two signals which are passed through the flip-flops 31 and gates 32 as illustrated to provide trace beginning blanking signals at the two lower outputs. The upper circuit shows the strobe transfer control signal for blanking the 5.0688 mc video pulses for the first part of a line of the video raster to provide the margin for the data fields.

As already indicated, the information is displayed on the cathode ray picture tube of a conventional television receiver or monitor. The information output from the video generator 6 comprises a serial bit stream which is suitable for direct coupling into a monitor or into a video input terminal provided on a conventional television circuit. Additionally, this signal may be coupled into a modulator to form television signals having a carrier frequency for any one of the regular television channels. This modulator circuit will comprise a conventional modulator of relatively low power whose output is coupled directly to the regular antenna terminals of the television receivers. The signals may be applied to conventional television receivers at appropriate spaced positions in a data processing center or other office using the data or the information may be transmitted by cable to remotely located television receivers.

The display circuitry, which is in effect a conversion circuit for reading out and translating coded data into a video serial bit stream, is controlled by a timing device wherein the conversion circuits are operated in synchronism with the video synchronizing signals. This being the case, it is possible to rearrange the position of the television screen traces by changing the timing of the various lines from the normal timing as indicated in Table 1. It is possible, for example, to interleave the data being recorded and viewed with a master record already recorded on one of the other fields of the main memory. In this fashion, a system operator may enter variable or new data immediately over fixed and spaced guide headings. In this case, the video display screen functions as a data form permitting the keyboard operator to visually check and to position the data entries in appropriate positions in a standard pattern.

The video display system described herein provides a relatively flexible data entry and retrieval means useful for a variety of purposes including data entry, data control, data display, data communication, and data storage and retrieval. It is also clear, however, that the system is advantageous as it comprises what is known as a hard wired circuit. In other words, the various functions relating to the data entry and display may be performed in a relatively straight forward manner by relatively unskilled machine operators. The system, by being hard wired, may also take advantage of various minute components such as integrated circuits or MOS techniques to reduce the circuit size and cost and to increase its reliability.

It will be seen that an improved video display system is provided for use in data processing. The visual display for the system is particularly adapted for direct use with a conventional television receiver of the type used in enormous numbers for home viewing. The system obtains the benefits of the ready availability and demonstrated reliability of the conventional television set and uses it without modification so that it is adapted for direct coupling either to the television set antenna, terminal, or to the video input of a monitor. Means are provided for simultaneously viewing information as it is recorded on a recording medium or for retrieving and viewing prior recorded data. The system is simplified by having the retrieval shift registers and code converting circuits which generate the video signal synchronized with the basic vertical and horizontal synchronizing signals of the television receiver. The circuit is also arranged to provide for the simultaneous display of up to four separate fields of information and each of these fields is arranged to be compatible with the conventional 80 character punch cards widely used in most computer systems.

The display system of the present invention is, therefore, suitable for providing a visual indication of information being applied to a recording medium such as a magnetic tape thereby giving the operator means for eliminating any errors in the recorded data as it is first applied to the recording medium. Additionally, the visual display of the recorded information permits a rapid view and read out of stored information and facilitates the encoding and storage on magnetic tape by one operator of data which presently would be first encoded on a large number of separate punch cards by several operators. The relative simplicity of the system also makes it suitable for incorporation in small and inexpensive instruments which may be positioned immediately adjacent to the normal working areas of the persons recording or using the data.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a system for processing digital data alphanumeric signals comprising a television raster scanline display screen on which is to be displayed a row of alphanumerics, each alphanumeric corresponding to an alphanumeric code of said digital data signals, each alphanumeric to occupy an alphanumeric space in said row, each alphanumeric to be displayed on said screen by lighting selected dot spaces within said alphanumeric space on one or more of a plurality of scanlines within said row, the improvement comprising, in combination, A. A cathode ray tube;

B. means for generating television type synchronizing signals;

C. means to apply said synchronizing signals to said cathode ray tube to generate a television raster scanline pattern;

D. input memory means for storing digital data alphanumeric signals in correspondence with said alphanumeric spaces;

second memory means for receiving said digital data alphanumeric signals from said input memory means and comprising a circulating shift register having digital data stored in correspondence to said alphanumeric spaces;

E. a read only memory (ROM) matrix responsive to a parallel stream of digital data signals identifying a character provided by said recirculating shift register and a vertical scanline signal representative of a scanline within said row for providing a parallel bit output signal representative of a sequence of dots comprising a line of that character on that scanline;

F. means for counting raster scanlines which occur within said alphanumeric row to provide said vertical scanline signal;

G. means responsive to said synchronizing signals to address said ROM with digital data in said second means for storing digital data to provide said parallel bit output signal;

H. output storage means responsive to said parallel bit output signal for storing the latter signal; and I. means responsive to said synchronizing signals for serially reading out the stored bits in said output storage means to provide a serial bit stream of video pulses corresponding to dot spaces on said scanline for illumination to form the character portion represented and for applying said bit stream to said cathode ray tube to light said dot spaces.

2. Apparatus for displaying characters on a television raster scanline display screen comprising, first memory means for receiving digital data signals representative of characters to be displayed in the form of fields with each field consisting of a predetermined number of rows and each row consisting of a predetermined number of character spaces, second memory means comprising a recirculating character shift register memory for receiving a row of characters from said first memory means, memory field selector means for selecting a field of digital data for transfer row-by-row to said second memory means, television display means having a raster scan for displaying said characters of a selected field in said predetermined number of rows in respective ones of said predetermined number of character spaces, raster line counter means for providing a count signal representative of the line then being scanned on said television display means, permanent read only memory means responsive to digital input signals provided by said recirculating character shift register representative of said characters for providing decoded output signals identifying the form of the characters decoded thereby on the raster line then being scanned as a parallel bit output signal representative of a sequence of dots comprising a line of that character, synchronizing clock means for providing synchronizing signals to synchronize the flow of digital data from said first memory means to said character shift register and from the latter to said permanent read only memory with the display of said characters on said television display means, means for coupling said synchronizing signals to said first memory means, said character shift register means, said raster line counter means and said television display means for synchronizing said flow, video generator means having output storage means for storing said parallel bit output signals, means responsive to said synchronizing signals for serially reading out the stored bits in said output storage means to provide a serial bit stream of video pulses corresponding to dot spaces on said scanline for illumination to form the character portion represented by the corresponding parallel bit output signal, and means for applying said video pulses to said television display means to illuminate said dot spaces thereon.

3. Apparatus for displaying characters in accordance with claim 2 wherein said permanent read only memory comprises a matrix for converting parallel bit input signals for one scan line at a time for the lines of each of the characters in a row in sequence as it is simultaneously addressed in turn by each of the characters in said character shift register and by said count signal to provide said parallel bit output signal in which the presence of a dot is represented by one binary digit and the absence of a dot is represented by the other binary digit, and said output storage means comprises a plurality of flip-flops addressed in parallel and read out in series.

* * * * *